US012182189B2

(12) United States Patent
Aso

(10) Patent No.: US 12,182,189 B2
(45) Date of Patent: Dec. 31, 2024

(54) INFORMATION PROCESSING APPARATUS, INFORMATION PROCESSING METHOD, AND STORAGE MEDIUM

(71) Applicant: CASIO COMPUTER CO., LTD., Tokyo (JP)

(72) Inventor: Asami Aso, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 243 days.

(21) Appl. No.: 17/894,496

(22) Filed: Aug. 24, 2022

(65) Prior Publication Data

US 2023/0102452 A1    Mar. 30, 2023

(30) Foreign Application Priority Data

Sep. 24, 2021    (JP) ................................ 2021-155030

(51) Int. Cl.
*G06F 40/242*      (2020.01)
*G06F 16/33*       (2019.01)
*G06F 16/335*      (2019.01)

(52) U.S. Cl.
CPC ........ *G06F 16/3344* (2019.01); *G06F 16/335* (2019.01); *G06F 40/242* (2020.01)

(58) Field of Classification Search
CPC .. G06F 16/3344; G06F 16/335; G06F 40/242; G09B 7/04; G09B 7/06; G09B 19/06
See application file for complete search history.

(56) References Cited

U.S. PATENT DOCUMENTS 9,117,374 B2 *    8/2015    Nguyen ................... G09B 7/00
10,812,425 B2 *   10/2020   Jeon ..................... H04L 12/1813
2021/0402286 A1 * 12/2021   Naoe ....................... A63F 13/80

FOREIGN PATENT DOCUMENTS

JP    2006228044 A    8/2006

* cited by examiner

*Primary Examiner* — Abul K Azad
(74) *Attorney, Agent, or Firm* — Holtz, Holtz & Volek PC

(57) ABSTRACT

An information processing apparatus comprises at least one processor that executes a program stored in a storage unit, the processor being configured to: acquire a plurality of registration information items relating to a word searched by a user; determine whether or not each of the registration items relating to the word satisfies a condition that is set in association with each of the registration information items, and derive the number of registration information items that satisfy the condition; and set a frequency of outputting a quiz relating to the word in a case where the quiz is repeatedly output to a value corresponding to the derived number.

20 Claims, 15 Drawing Sheets

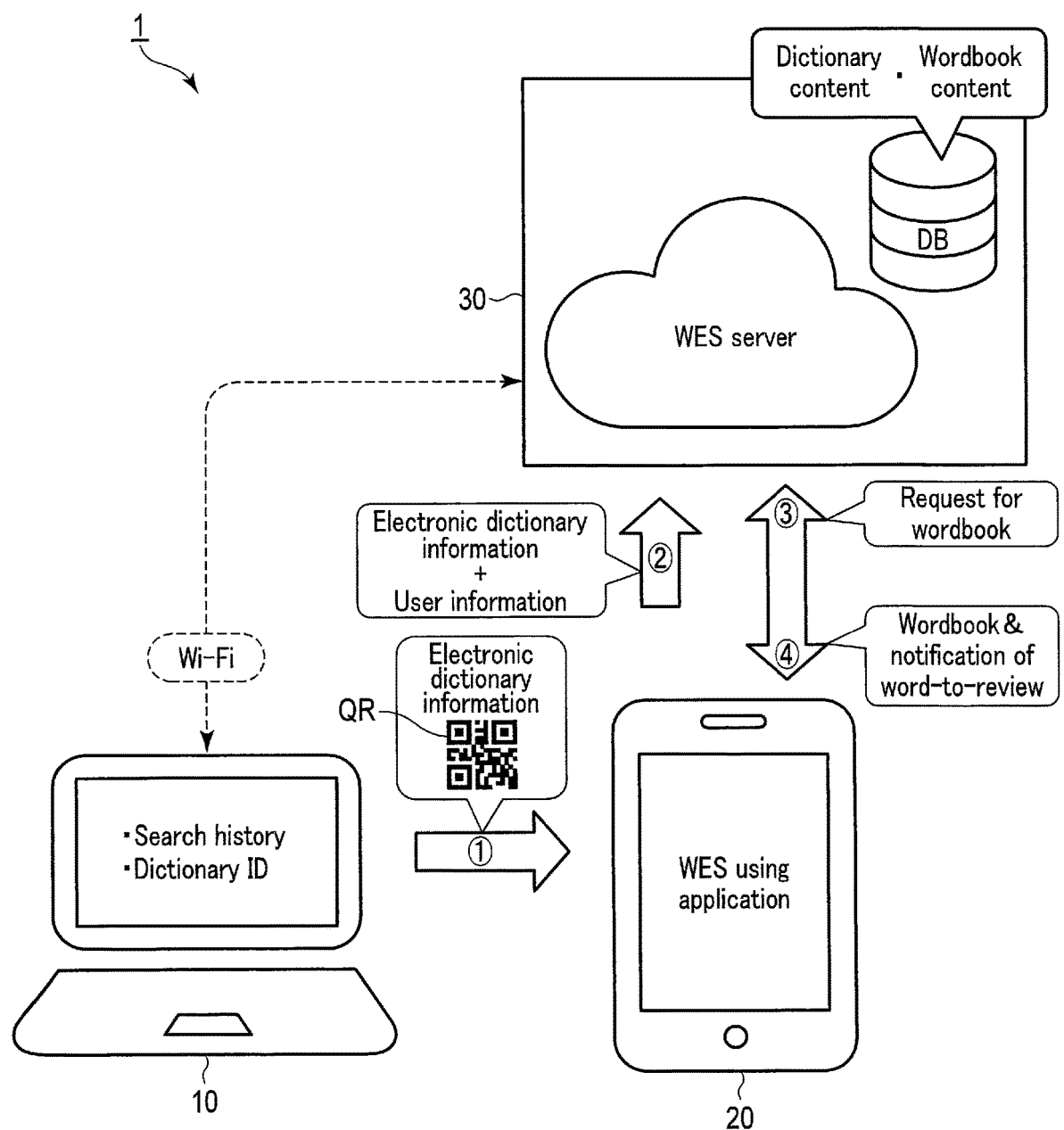
F I G. 1

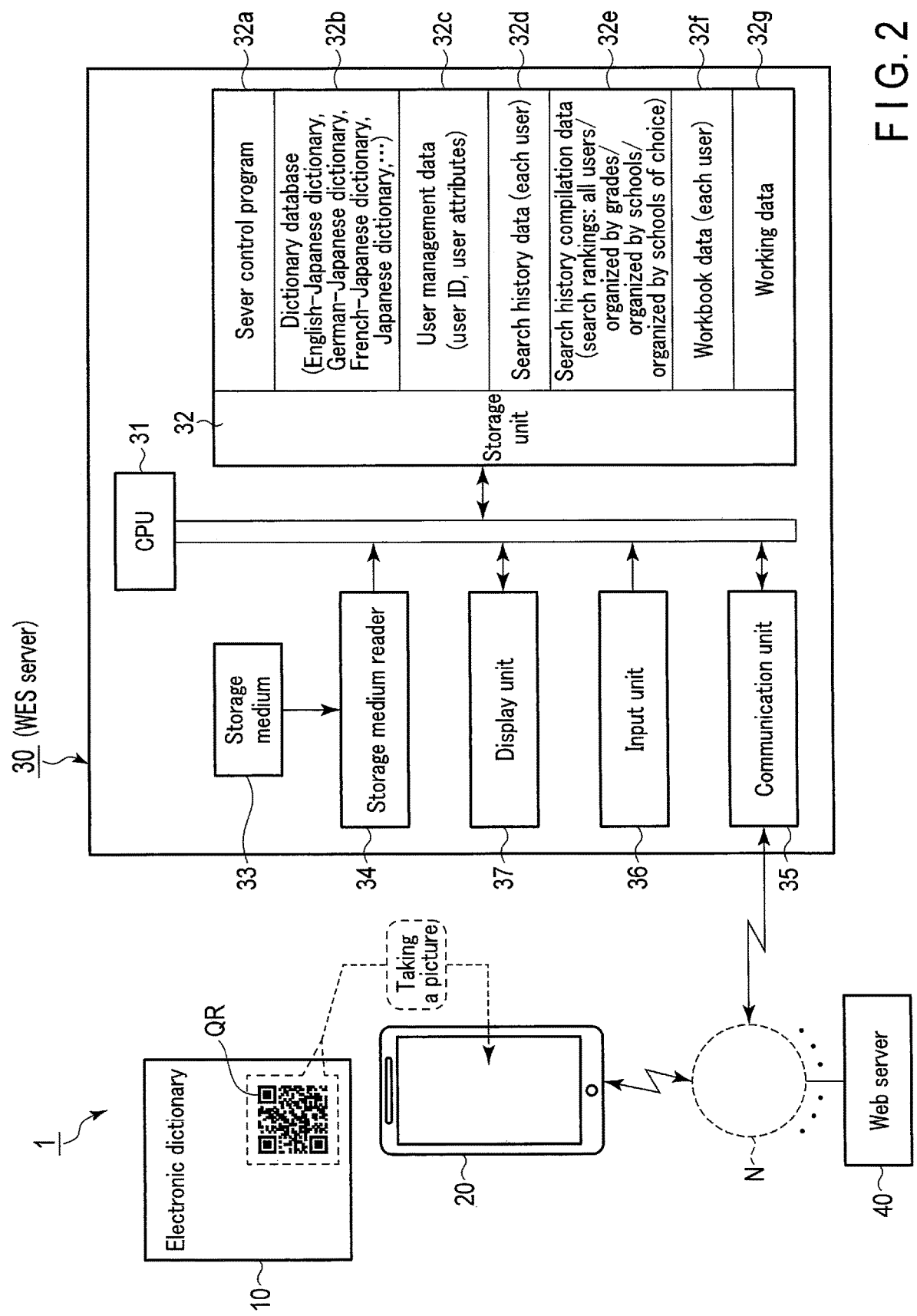

32b (Dictionary database: English-Japanese dictionary)

| English words | Translations | Example sentences |
|---|---|---|
| various | さまざまな | people of various ⋯ |
| apple | りんご | ⋯ |
| orange | みかん | ⋯ |
| ⋯ | ⋯ | ⋯ |

| User information | |
|---|---|
| App ID | 12345678 |
| School | First High School |
| Grade | Grade 3 |
| School of choice | University T |

A2(32d)

| English words | Time and date of search | Number of times search is performed | View time |
|---|---|---|---|
| various | 2020.09.01 | 3 | 32s |
| apple | 2020.09.01 | 1 | 6s |
| orange | 2020.09.01 | 2 | 11s |
| respective | 2020.08.15 | 3 | 29s |

(A)

B1(32c)

| User information | |
|---|---|
| App ID | 12345600 |
| School | Second High School |
| Grade | Grade 3 |
| School of choice | University K |

B2(32d)

| English words | Time and date of search | Number of times search is performed | View time |
|---|---|---|---|
| dog | 2020.08.01 | 1 | 8s |
| cat | 2020.08.01 | 1 | 9s |
| lion | 2020.08.01 | 2 | 12s |
| various | 2020.07.15 | 4 | 30s |

32e (Search history compilation data)

Rankings of searched English words (Weekly: all users)

| Ranking | English words | Number of times | Rate |
|---|---|---|---|
| 1 | various | 10000 | 67.2 |
| 2 | apple | 9999 | 66.1 |
| 3 | tiger | 9998 | 60.4 |
| 4 | orange | 9997 | 60.3 |
| 5 | you | 9996 | 57.7 |
| 6 | me | 9995 | 54.2 |
| 7 | lion | 9994 | 45.9 |
| 8 | ... | ... | ... |
| 9 | ... | ... | ... |
| 10 | ... | ... | ... |
| ⋮ | ⋮ | ⋮ | ⋮ |

(A)

Rankings of searched English words (Weekly: users who aim at University T)

| Ranking | English words | Number of times | Rate |
|---|---|---|---|
| 1 | various | 10 | 27.2 |
| 2 | apple | 9 | 26.1 |
| 3 | tiger | 8 | 20.4 |
| 4 | orange | 7 | 20.3 |
| 5 | you | 6 | 17.7 |
| 6 | me | 5 | 14.2 |
| 7 | lion | 4 | 5.9 |
| 8 | ... | ... | ... |
| 9 | ... | ... | ... |
| 10 | ... | ... | ... |
| ⋮ | ⋮ | ⋮ | ⋮ |

(B)

(Wordbook data) 32f

| English words | Translations | Example sentences | Time and date of search | Number of times search is performed | View time | Search rate by occupation Occupation (3rd grade of High School) | Search rate by school of choice First choice (University T) | Search rate by school of choice Second choice (University K) | Search rate by school of choice Third choice (university W) |
|---|---|---|---|---|---|---|---|---|---|
| various | さまざまな | people of various… | 2020.09.01 | 3 | 32s | 67.2 | 57.2 | 47.2 | 67.2 |
| apple | りんご | … | 2020.09.01 | 1 | 6s | 66.1 | 56.1 | 46.1 | 66.1 |
| orange | みかん | … | 2020.09.01 | 2 | 11s | 60.3 | 50.3 | 40.3 | 60.3 |
| … | … | … | … | … | 29s | … | … | … | … |

22e

| Display/ non-display | Number of times of displaying cards | Number of times of tapping after notification | Number of times for sending a notification | History of notification | Words- to-review |
|---|---|---|---|---|---|
| TRUE | 4 | 3 | 5 | [[20200911,0],[2020.. | 1 |
| FALSE | 1 | 0 | 0 | – | 0 |
| TRUE | 1 | 2 | 3 | [[20200801,1]] | 1 |
| … | … | … | … | … | … |

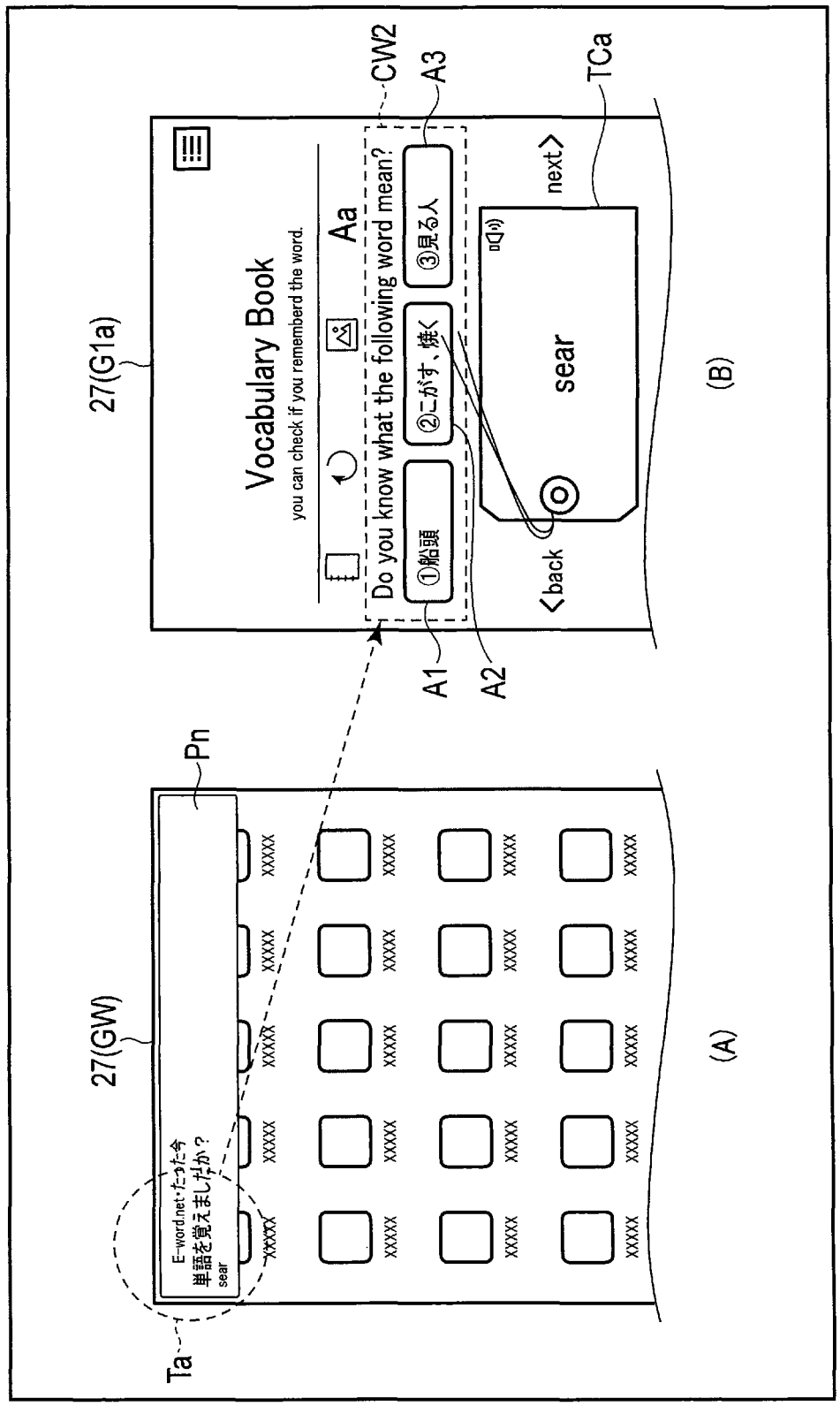
F I G. 16

INFORMATION PROCESSING APPARATUS, INFORMATION PROCESSING METHOD, AND STORAGE MEDIUM

CROSS-REFERENCE TO RELATED APPLICATION

This application is based upon and claims the benefit of priority under 35 USC 119 of Japanese Patent Application No. 2021-155030, filed on Sep. 24, 2021, the entire disclosure of which, including the description, claims, drawings, and abstract, is incorporated herein by reference in its entirety.

FIELD

The present disclosure relates to an information processing apparatus, an information processing method, and a storage medium.

BACKGROUND

Electronic dictionaries are widely used to look up translations or word meanings in a student's learning process.

Jpn. Pat. Appin. KOKAI Publication No. 2006-228044 discloses an electronic dictionary which helps a user effectively learn words by producing and giving word quizzes based on entries searched by a user with a high frequency and dictionary data corresponding to those entries.

SUMMARY

An information processing apparatus according to an embodiment of the present disclosure comprises at least one processor that executes a program stored in a storage unit, the at least one processor being configured to: acquire a plurality of registration information items relating to a word searched by a user; determine whether or not each of the registration items relating to the word satisfies a condition that is set in association with each of the registration information items, and derive the number of registration information items that satisfy the condition; and set a frequency of outputting a quiz relating to the word in a case where the quiz is repeatedly output to a value corresponding to the derived number.

An information processing method according to an embodiment of the present disclosure is executed by a computer and comprises: acquiring a plurality of registration information items relating to a word searched by a user; determining whether or not each of the registration items relating to the word satisfies a condition set in association with each of the registration information items, and deriving the number of registration information items that satisfy the condition; and setting a frequency for outputting a quiz relating to the word in a case where the quiz is repeatedly output to a value corresponding to the derived number.

A non-transitory computer-readable storage medium according to an embodiment of the present disclosure stores a program executable by at least one processor of an information processing apparatus, and the at least one processor is configured to, in compliance with the program: acquire a plurality of registration information items relating to a word searched by a user; determine whether or not each of the registration items relating to the word satisfies a condition set in association with each of the registration information items, and derive the number of registration information items that satisfy the condition; and set a frequency for outputting a quiz relating to the word in a case where the quiz is repeatedly output to a value corresponding to the derived number.

BRIEF DESCRIPTION OF THE DRAWINGS

FIG. 1 is a diagram showing an entire configuration of a learning support system 1 according to an embodiment of an information processing apparatus, an information processing method, and a storage medium.

FIG. 2 is a block diagram showing a configuration of an electronic circuit of a WES server 30.

FIG. 3 is a diagram showing a part of the dictionary data, which is stored in a dictionary database storage area 32b, in which English words, which are entries of an English-Japanese dictionary, are associated with translations and example sentences for explanatory information of the English words.

FIG. 4 is a diagram showing an example of user information stored in a user management data storage area 32c and search history data stored in a search history data storage area 32d.

FIG. 5 is a diagram showing an example of search history compilation data stored in a search history compilation data storage area 32e.

FIG. 6 is a diagram showing wordbook data content stored in a wordbook data storage area 32f of a WES server 30.

FIG. 11A is a diagram showing a display operation of the wordbook data (22e) in accordance with the wordbook use processing in the user device 20.

FIG. 11B is a diagram showing a display operation of the wordbook data (22e) in accordance with the wordbook use processing in the user device 20.

FIG. 11C is a diagram showing a display operation of the wordbook data (22e) in accordance with the wordbook use processing in the user device 20.

FIG. 16 is a diagram showing a display operation (part 3) after the sending of a push notification Pn and the tapping thereof Ta in accordance with the word-to-review notification processing of the user device 20.

DETAILED DESCRIPTION

Figure 7:
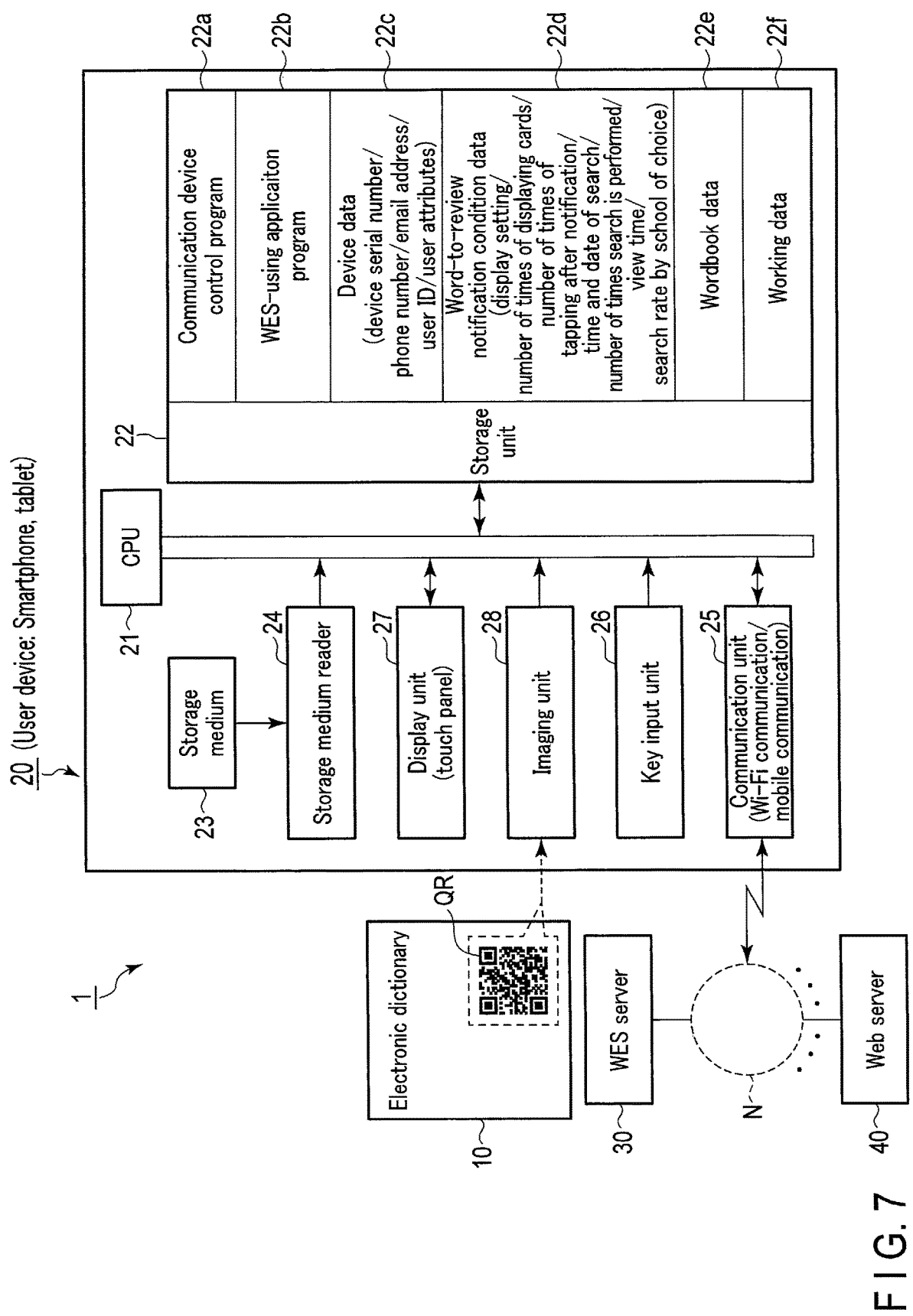
FIG. 7 is a block diagram showing a configuration of an electronic circuit of a user's device (communication device) 20.

Hereinafter, the present disclosure will be described with reference to the drawings.
(Structures According to Embodiment)
FIG. 1 is a diagram showing an entire configuration of a learning support system 1 according to an embodiment of an information processing apparatus, an information processing method, and a program.

A learning support system 1 is configured with an electronic dictionary (electronic device) 10, a user's device (communication device) 20, and a WES (Worldwide Education Service) server (server apparatus) 30 which is provided on a communication network N, such as an Internet. The WES server described herein refers to a dedicated server for connecting an electronic dictionary or the WES-using application to a cloud service. Any of the electronic dictionary 10, the user device 20, the WES server 30 may be an information processing apparatus.

The electronic dictionary (electronic device) 10 may be configured as a device having a dictionary function, such as a smartphone, a tablet device, a personal computer (PC), a mobile phone, an electronic book, or a portable game player, aside from a dedicated electronic dictionary 10, which is described hereinafter.

The user device 20 may be configured as a smartphone, a tablet device, a PC, a mobile phone, an electronic book, or a portable game player having a communication function.

On the user device 20, an application program that uses the WES server 30 (a WES-using application in this example) is installed.

<Functions of Learning Support System 1>

The learning support system 1 shown in FIG. 1 has at least the following functions (10*a*), (20*a*), (20*b*), (20*c*), (20*d*), (20*e*), (20*f*), (30*a*), (30*b*), and (30*c*).

In the electronic dictionary 10, the function (10*a*) is for encoding electronic dictionary information including a dictionary ID (which is dictionary identification information and may also serve as user identification information; "dictionary (user) ID") and word search history into a two-dimensional code QR and displaying the code.

In the user device 20, the function (20*a*) is for reading a two-dimensional code QR displayed on the electronic dictionary 10, and decoding such to electronic dictionary information (which includes a dictionary ID and a search history) in accordance with a WES-using application, and the function (20*b*) is for sending to the WES server 30 data in which the user information (which includes an app ID (user identification information) and user attribute information indicating occupation (school)/grade/user's school of choice) is added to the decoded electronic dictionary information.

In the WES server 30, the function (30*a*) is for compiling search rankings for words of all users, or each user attribute, based on the electronic dictionary information (which includes a dictionary ID and a search history) received from the user device 20 and user information (which includes an app ID (user identification information) and user attribute information indicating occupation (school)/grade/user's school of choice).

In the WES server 30, the function (30*b*) is for extracting the predetermined number of words from the words included in a search history based on the electronic dictionary information (which includes a dictionary ID and a search history) received from the user device 20, generating a wordbook listing the extracted words as words-to-review, and storing the generated wordbook associated with a dictionary (user) ID or an app ID.

In the WES server 30, the function (30*c*) is for sending the data of a wordbook associated with a dictionary (user) ID or app ID of the user device 20 to the user device 20 from which a request for the wordbook originates.

In the user device 20, the function (20*c*) is for causing the user device 20 to receive and display data of a wordbook corresponding to a dictionary (user) ID or an app ID of the user device 20 sent from the WES server 30, and function (20*d*) is for efficiently determining words-to-review that are predicted as words a user wants or needs to learn with a high priority based on a plurality of preset notification conditions for user notification in the form of a push notification Pn (see FIGS. 14 to 16), and making these words notification targets, and setting the number of notifications in accordance with the number of the satisfied notification conditions.

In the user device 20, the function (20*e*) is for setting the date and time of a notification (date and time of a push notification) predicted to be efficient and effective for user learning of the words-to-review if a notification is sent the set number of times, and the function (20*f*) is for notifying a user of the words-to-review targeted for notification by displaying the words as a push notification in accordance with the date and time of a push notification.

Herein, examples of a plurality of notification conditions that are set in advance for efficient determination of words (words-to-review) predicted as those a user wants or needs to learn with a high priority, and examples of a method for setting the date and time of notification (date and time of push notification), at which a user is predicted to learn the notified words-to-review effectively and efficiently, will be explained later in detail.

According to the learning support system 1, a wordbook of words-to-review for each user can be automatically produced based on a word search history obtained by the electronic dictionary 10. Of the words-to-review included in the wordbook for each user, the words predicted as those the user wants or needs to learn with a high priority are set as notification targets, and these words are notified to a user in the form of a push notification in accordance with the number of times and a date and time of notification at which efficient and effective user learning is predicted; a user can thus efficiently and effectively review the words they want to learn.

If the electronic dictionary 10 and the user device 20 have a short-distance radio communication function such as Bluetooth™, the electronic dictionary information (including a dictionary ID and a search history) may be sent to the user device 20 via such a short-distance radio communication.

If the electronic dictionary 10 has a communication function for communicating with the communication network N such as Wi-Fi™, a WES-using application may be installed on the electronic dictionary 10 so that the electronic dictionary 10 also has the above-described functions (20*a*), (20*b*), (20*c*), (20*d*), (20*e*), and (20*f*) of the user device 20.

If the user device 20 has a dictionary function, a word search history may be generated and stored by the user device 20 itself. If the user device 20 does not have a dictionary function and the dictionary data search is performed using the dictionary function of the WES server 30, a word search history may be generated and stored by the WES server 30.

<Electronic Circuit of WES Server 30>

FIG. 2 is a block diagram showing a configuration of an electronic circuit of a WES server 30.

The electronic circuit of the WES server 30 has a control unit (central processing unit, CPU) 31, which is a computer serving as at least one processor, a storage unit 32, a storage medium reader 34, a communication unit 35, an input unit 36, and a display unit 37 (for example a liquid crystal display).

The control unit 31 controls an operation of each unit in the circuit in accordance with the server control program 32a stored in the storage unit 32, in response to an input signal corresponding to a user operation input via the input unit 36, or a receive signal received by the communication unit 35 from a user device 20 on the communication network N.

The server control program 32a may be either stored in the storage unit 32 in advance or read from an external storage medium 33 (e.g., a CD-ROM) via the storage medium reader 34 and stored in the storage unit 32, or downloaded and read from a Web server (a program server in this example) 40 on the communication network N and stored in the storage unit 32.

The server control program 32a includes a program for implementing at least the above-described functions (30a) to (30c).

In the storage unit 32, aside from the storage area for the server control program 32a, the dictionary database storage area 32b, the user management data storage area 32c, the search history data storage data 32d, the search history compilation storage area 32e, the wordbook data storage area 32f, the working data storage area 12g are secured.

In the dictionary database storage area 32b, various types of dictionary data, such as an English-Japanese dictionary, a German-Japanese dictionary, a French-Japanese dictionary, a Japanese dictionary, are stored, being associated with explanatory information such as entry words, translations corresponding thereto, definitions, exemplary sentences, explanations, etc.

FIG. 3 is a diagram showing a part of the dictionary data, which is stored in a dictionary database storage area 32b, in which English words, which are entries of an English-Japanese dictionary, are associated with translations and example sentences for explanatory information of the English words.

In the user management data storage area 32c, user attributes (occupation (school), grade, user's school of choice, etc.) are stored, being associated with a user ID (user identification information; app ID in this example) for each user of the user device 20 on which the WES-using application is installed. The user attributes are periodically updated by a user at discretionary timing, for example at timing at which a new academic year starts.

In the search history data storage area 32d, entries (words) that a user has searched and the date and time of the last search, the number of times a search is conducted, and a view time (seconds) are associated with each other and stored for each user ID stored and managed in the user management data storage area 32c. The view time is a length of time during which a user views explanatory information displayed in response to a search of an entry, and includes time associated with an operation, such as scrolling the displayed content.

FIG. 4 is a diagram showing an example of user information stored in a user management data storage area 32c and search history data stored in a search history data storage area 32d, and (A) in FIG. 4 shows an example of the user information A1 and the search history data A2 corresponding to the user information A1, and (B) shows an example of the user information B1 and the search history data B2 corresponding to the user information B1.

In the search history compilation data storage area 32e, search rankings of words compiled for all users or on a user attribute basis (organized by occupations, schools, grades, or users' schools of choice) for a predetermined period (e.g., an entire period, year, month, or week), based on word search history of each user stored in the search history data storage area 32d, are stored as search history compilation data in which the rankings are associated with the number of times each word has been searched and a search ratio (a ratio of users who conducted a search for the word among the users belonging to the same user attribute).

FIG. 5 shows an example of search history compilation data stored in the search history compilation data storage area 32e. Data (A) shown in FIG. 5 shows an example of weekly rankings of searched English words based on a search history of an English-Japanese dictionary corresponding to a range of users of a certain user attribute ("entire users"). Data (B) shows an example of weekly rankings of searched English words based on a search history of an English-Japanese dictionary corresponding to a range of users of a certain user attribute (e.g., "users who want to go to University T).

In the wordbook data storage area 32f, for each user ID stored and managed in the user management data storage area 32c, a wordbook generated uniquely for each user based on the search history data stored in the search history data storage area 32d is stored as wordbook data of the predetermined number of words (for example 100 words).

FIG. 6 is a diagram showing wordbook data content stored in a wordbook data storage area 32f of a WES server 30.

If the number of words included in the search history data of a targeted user is smaller than 100, all words in the wordbook data are extracted as words for a wordbook to be generated (words-to-review); if, on the other hand, the number is larger than 100, the 100 most searched, longest viewed, or most recently viewed words, in other words, 100 prioritized words that a user wants to learn, are extracted as words for a wordbook to be generated (words-to-review).

As wordbook data, as shown in FIG. 6, the words extracted from the search history data (32d), explanatory information of the same words extracted from the dictionary database (32b) (translations, example sentences), time and date of search, the number of times a search is conducted, a length of a view time extracted from the search history data (32d), and the search ratio corresponding to a user attribute extracted from the search history compilation data (32e) (a search ratio of users of the same grade and a search ratio of users who want to go to the same school in this example) are associated with each other and stored. The time and date of search, the number of times a search is conducted, a length of view time, and search ratios, which are associated with a word in the wordbook data, are registration information in which a search situation for the extracted words unique to a user is registered.

The wordbook data (32f) generated in the WES server 30 has the information items which are encircled by a bold line in FIG. 6. Upon receipt (downloading) of the wordbook data (32f) unique to a user in response to a request for a wordbook originating from a user device 20, the wordbook data (32f) is stored in the wordbook data storage area 22e, (to be described later) (see FIG. 7) for each word, together with the following information items: information for setting a display or non-display of a word [display/non-display]; information for the number of times a word card is to be displayed [the number of times of displaying a card]; information of the number of times a push notification is tapped in response to notification of a word as a word-to-review [the number of times for tapping after notification]; information of the number of times a push notification is sent [the number of times of notification]; information of the date and time of a push notification [notification history]; and information for the setting of a word to "1" (word-to-review) or "0" (word-to-not review) [words-to-review]. For a word newly added to the wordbook data (22e), information [words-to-review] is set to the default of "1" (word-to-review). These information items also serve as the registration information for each word.

In the working data storage area 32g, various types of data generated or acquired in accordance with a control of an operation of each unit by the control unit 31 are temporarily stored as needed.

The WES server 30 configured in the above-described manner achieves implementation of the various functions to be described later in the explanation of the operation, if the control unit 31 controls an operation of each unit of the circuit in accordance with an instruction described in the server control program 32a, and the software and the hardware operate in conjunction.

<Electronic Circuit of User Device 20>

FIG. 7 is a block diagram showing a configuration of an electronic circuit of a user device (communication device) 20.

The electronic circuit of the user device 20 has a control unit (CPU) 21, which is a computer serving as at least one processor, a storage unit 22, a storage medium reader 24, a communication unit (Wi-Fi™ communication/mobile communication)25, a key input unit 26, a touch-panel display unit 27, and an imaging unit 28. The touch-panel display unit 27 may be a structure obtained by stacking a capacitive touch panel on a liquid crystal display.

The control unit 21 controls an operation of each unit in the circuit in accordance with the communication device control program 22a and the WES-using application program (WES using application) 22b stored in the storage unit 22. The communication device control program 22a may be: stored in the storage unit 22 in advance; read from the external storage medium 23 such as a memory card by the storage medium reader 24 and stored in the storage unit 22; or downloaded from a Web server (program server in this example) 40 on the communication network N via the communication unit 25 and stored in the storage unit 22.

The WES-using application 22b is downloaded from a Web server (a program server of an application store in this example) 40 on a communication network N via the communication unit 25 and stored in the storage unit 22.

Besides a system program for controlling the entirety of the user device 20, the communication device control program 22a includes a program for communicating and connecting with external communication devices, including the WES server 30 on the network N and the Web server 40, in conjunction with various application programs stored in the storage unit 22.

The WES-using application 22b includes programs for implementing the above-described functions (20a), (20b), (20c), (20d), (20e), and (20f).

Aside from the storage unit 22, the storage medium reader 24, and the communication unit 25, a key input unit 26 that includes a power key and a volume adjust key, a touch-panel display unit 27, and an imaging unit 28 are connected to the control unit 21 via a system and a data bus.

Aside from the program storage area for storing the communication device control program 22a and the WES-using application 22b, a device data storage area 22c, a words-to-review notification condition data storage area 22d, a wordbook data storage area 22e, and a working data storage area 22f are secured in the storage unit 22.

Aside from the serial number of the terminal device for communicating with or connecting to external communication devices including the WES servers 30 and Web servers 40 on the communication network N, data such as a telephone number, an email address, a user ID, (user identification information; an app ID in this example), user attributes (occupation (school)/grade/user's school of choice), etc. are stored in the device data storage area 22c, as device data unique to the user device 20.

Conditions for setting a word that a user wants or needs to learn with a high priority among the words-to-review included in the wordbook data (22e; see FIG. 6) stored in the wordbook data storage area 22e as a word-to-review slated to be notified to the user ("words-to-review notification conditions") are stored in the word-to-review notification condition data storage area 22d.

The following information is stored in the wordbook data (22e; see FIG. 6) as the words-to-review notification conditions for the registration information items relating to the past search and display associated with each word: information indicating "display" for the registration information [display/non-display]; information indicating "date and time" serving as a threshold for determining whether date and time of search is after a predetermined date and time (e.g., date and time a year ago) for the registration information item [date and time of search]; information indicating "the number of times" serving as a threshold for determining each number of times that exceeds a predetermined number of times for the registration information items [the number of times of displaying cards], [the number of times of tapping after notification], [the number of times a search is performed]; information indicating "time (s)" serving as a threshold for determining whether the view time is longer than a predetermined length of time for the registration information item [view time]; and information indicating "rate (%)" serving as a threshold for determining whether the search rate exceeds a predetermined rate for the registration information item [search rate organized by user's school of choice].

The words-to-review notification conditions may be discretionarily set by a user after being set to the default based on the WES-using application 22b.

For example, if a word for which the words-to-review notification condition [display/non-display] is set to "display", it is highly possible that a user has not yet learned (wants to learn) the word. If a word for which [date and time of search] is set to "date and time" a year ago, it is highly possible that the user has been trying to learn the word. "The number of times" of each of [the number of times of displaying cards], [the number of times of tapping after notification], [the number of times a search is performed], and "time (s)" of [view time] indicate an extent to which the user has not yet learned (wants to learn) the word. The "rate (%)" of [search rate organized by user's school of choice] indicates an extent to which the user should learn the word for the entrance examination.

By setting those words-to-review that satisfy the words-to-review notification conditions as notification targets, it is possible to efficiently set the words-to-review that a user wants to or needs to learn with a high priority among the words included in the wordbook data (22e) as notification targets. Furthermore, by setting the number of times the words-to-review are notified in accordance with the number of satisfied notification conditions, it is possible to notify a user of such words at a high frequency and make the user learn the words that the user has not yet learned (wants to learn) or the words to be learned with a high degree of necessity.

In the wordbook data storage area 22e, the user's wordbook data (32f) downloaded from the WES server 30 is stored together with the following registration information items, as described in the above with reference to FIG. 6: [display/non-display ("display" in the default setting), [the number of times of displaying cards], [the number of times of tapping after notification], [the number of notifications] ("0" in the default setting), [notification history] (blank in the default setting), [words-to-review] ("1" (word-to-review)). This combined data is called "wordbook data (22e)".

In the working data storage area 22f, various types of data generated or acquired in accordance with a control of an operation of each unit by the control unit 21 are temporarily stored as needed.

The user device 20 as configured in the above-described manner realizes implementation of the above-described functions, to be described later in the description of the operation, if the control unit 21 controls an operation of each unit of the circuit in accordance with an instruction described in the communication device control program 22a and the WES-using application 22b.

Figure 8:
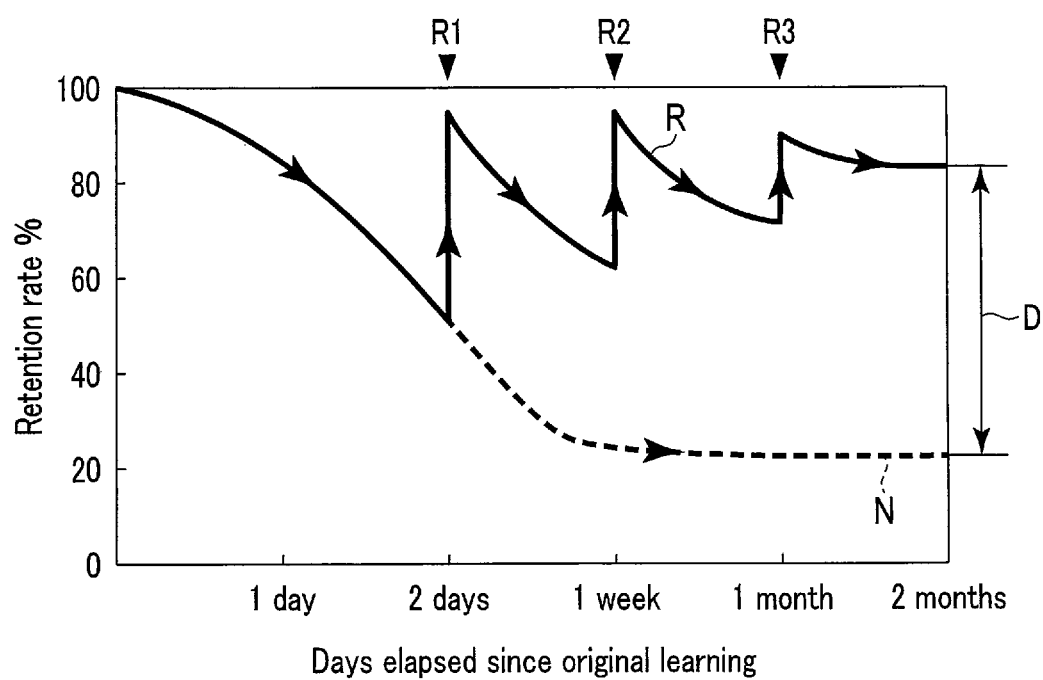
FIG. 8 is a diagram showing characteristics of human forgetfulness, which provide criteria for setting the timing (date and time of push notification) at which a word in wordbook data (22e) set as a word-to-review is displayed on the user device 20 as a push notification.

FIG. 8 is a diagram showing the characteristics of human forgetfulness, which provide criteria for setting the timing (date and time of sending a push notification) at which a word in the wordbook data (22e) has been set as a target for notification in the user device 20.

The user device 20 of the embodiment sets the date and time of notifying a word-to-review (date and time of sending a push notification) at the optimal timing for review, which is determined from the timing of previous learning and predicted to be optimal for efficient and effective user learning of the word-to-review, based on the characteristics of human forgetfulness as shown in FIG. 8.

Herein, two days, one week, and one month after the user originally learns the word are the timings at which the retention rate is predicted to fall within the range of 50% to 70%, and these dates and times are set as first time R1, second time R2, and third time R3, respectively, for the timing for sending a push notification. In other words, the date and time for sending a push notification is set in such a manner that intervals between push notifications (intervals between sending a quiz) become wider every time a push notification is sent (a quiz is sent).

Assume that date and time for sending a push notification for a word-to-review is set to first time R1, second time R2, third time R3, based on characteristics of human forgetfulness. In the case where the user does not review after the original learning (N), the retention rate after two months is 20% or lower. In contrast, if the user reviews (R), the retention rate is 80% or higher. Thus, learning through spaced repetition can improve the retention rate significantly (D).

Operation of Embodiment

Next, an operation of the learning support system 1 of the embodiment is described.

Figure 9:
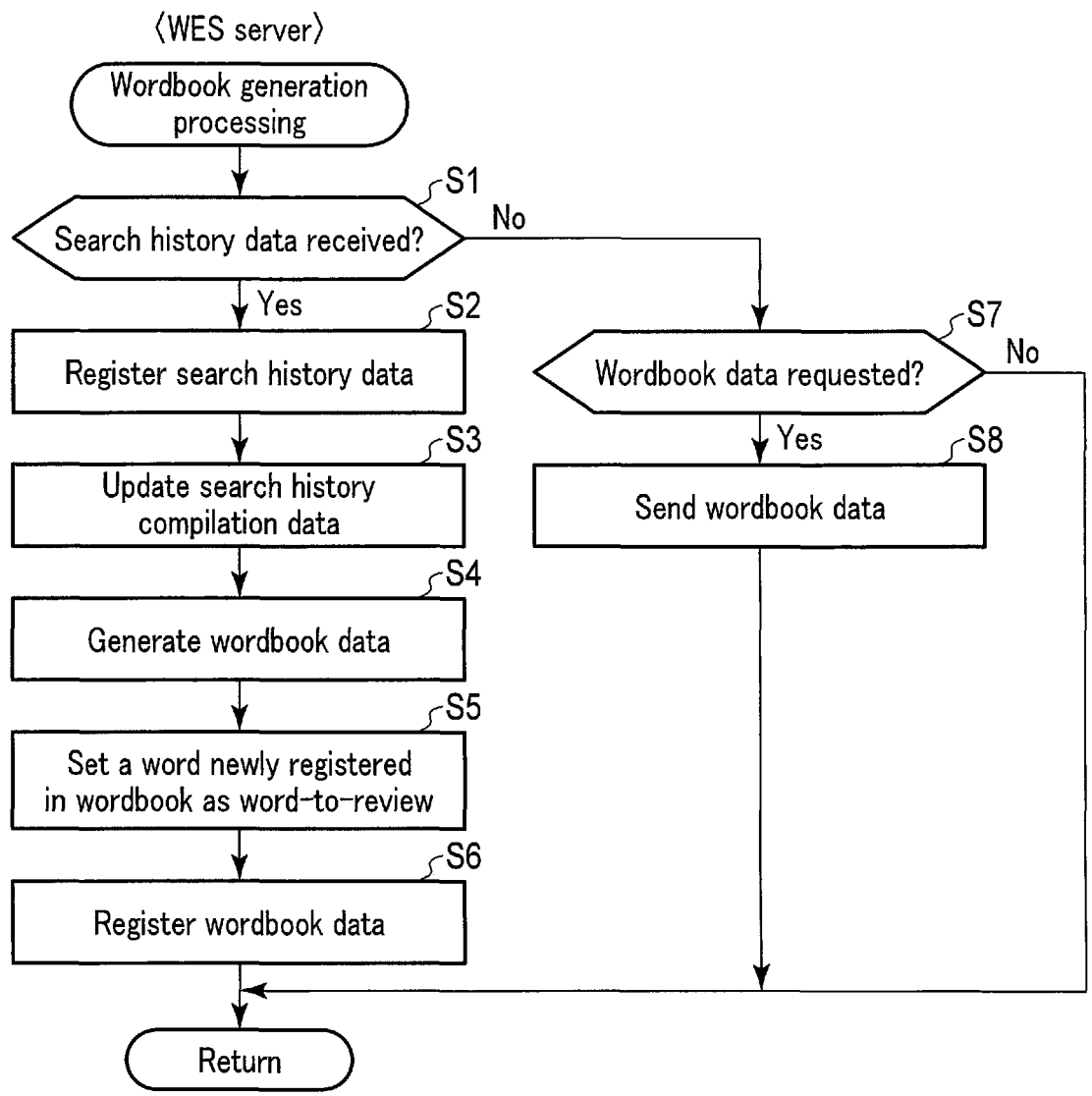
FIG. 9 is a flowchart showing wordbook generation processing in accordance with a server control program 32a of the WES server 30.

FIG. 9 is a flowchart showing wordbook generation processing in accordance with a server control program 32a of the WES server 30.

In the WES server 30, as shown in FIG. 1 for example, upon receipt of electronic dictionary information (including a dictionary ID and a search history) sent from the user device 20 and user information (including an app ID, which is user identification information, and user attribute information which includes occupation (school)/grade/user's school of choice) (Yes in step S1), the control unit 31 stores and registers the received search history data in the search history data storage area 32d, associating it with a user ID (app ID in this example), as shown in FIG. 4 for example (step S2).

At this time, the control unit 31 may update the user attributes associated with the user ID and stored in the user management data storage area 32c, based on the received user information.

Setting a length of time (for example, year, month, or week), the control unit 31 compiles, based on a word search history of each user stored in the search history data storage area 32d, search rankings of words for all users or organized by user attribute (categorized by occupation, school, grade, or user's school of choice) as shown in FIG. 5 for example, and stores the compiled rankings in the search history compilation data storage area 32e.

At this time, if word search rankings of the same period and the same user attribute are stored in the search history compilation data storage area 32e, the control unit 31 updates the rankings to the latest search rankings (step S3).

The control unit 31 generates, based on the search history data registered in the search history data storage area 32d in step S2 and the word search rankings organized by user attribute stored in the search history compilation data storage area 32e in step S3, wordbook data (32f) in which the predetermined number of words (e.g., 100 words) are associated with explanatory information of these words (translations, example sentences), [date and time of search], [the number of times a search is performed], [view time], [search ratio] corresponding to a user attribute (in this example, a search ratio of the users of the same grade and a search rate of the users desiring to attend the same school) as shown in FIG. 6 (step S4). Subsequently, the control unit 31 sets the words newly included in the wordbook data (32f) as words-for-review (step S5). Then, the control unit 31 stores and registers the generated wordbook data (32f) in the wordbook data storage area 32f, associating it with a user ID (step S6).

Upon receipt of a signal requesting for acquisition of the wordbook data from the user device 20 of a user whose user ID is stored and managed in the user management data storage area 32c (wordbook acquisition requesting signal) (Yes in step S7), the control unit 31 sends to the user device 20 the wordbook data (32f) associated with the received user ID of the user device 20 and registered in the wordbook data storage area 32f (step S8).

Figure 10:
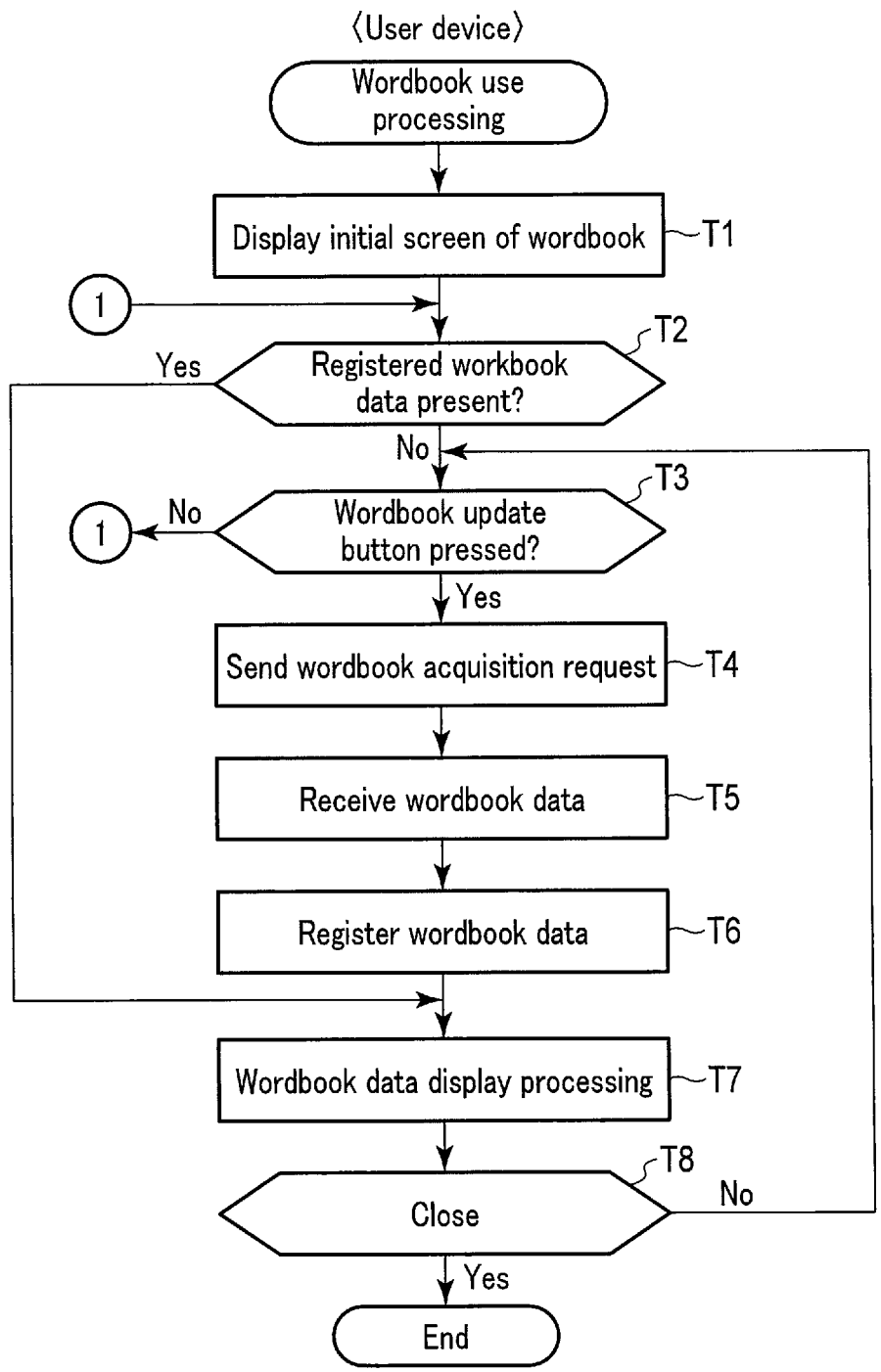
FIG. 10 is a flowchart showing wordbook use processing in accordance with a WES-using application 22b of the user device 20.

FIG. 10 is a flowchart showing wordbook use processing in accordance with a WES-using application 22b of the user device 20.

Figures 11A, 11B, 11C:
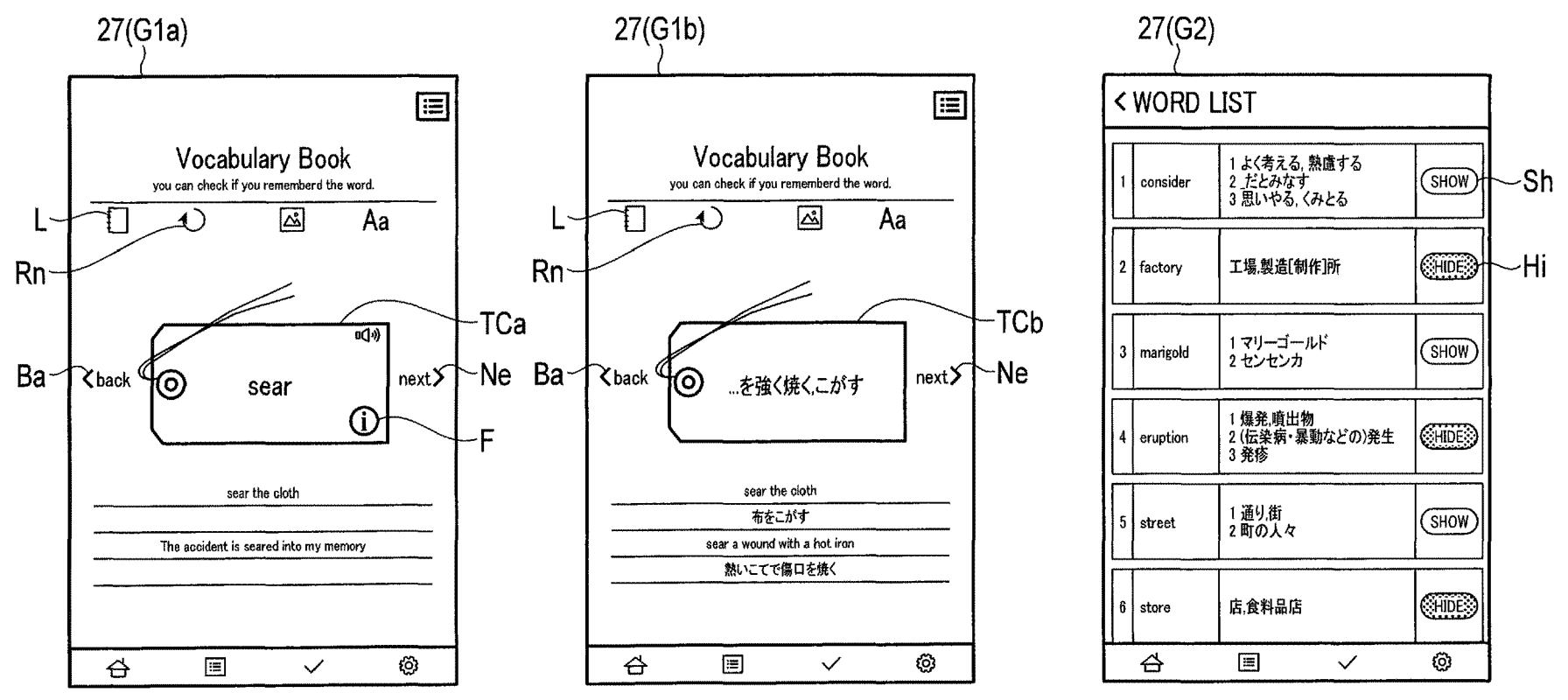

FIGS. 11A, 11B, and 11C show an operation for displaying the wordbook data (22e) in accordance with the wordbook use processing in the user device 20.

In the user device 20, upon activation of the WES-using application 22b, the control unit 21 causes the touch-panel display unit 27 to display the wordbook initial screen G1a as shown in FIG. 11A, for example (step T1).

Herein, if there is wordbook data (22e) that has already been received (downloaded) from the WES server 30 and registered in the wordbook data storage area 22e, the control unit 21 causes the wordbook initial screen G1a to display a discretionarily chosen word card (English word) TCa included in the wordbook data (22*e*) and proceeds to the wordbook data displaying process (Yes in step T2, then step T7).

If the wordbook data (22*e*) is not registered in the wordbook data storage area 22*e*, the control unit 21, on the other hand, causes the touch-panel display unit 27 to display the wordbook initial screen G1*a* that does not include a word card (English word) TCa (No in step T2).

If the wordbook update button Rn provided on the top part of the wordbook initial screen G1*a* is pressed (touched) (Yes in step T3), the control unit 21 sends a wordbook acquisition requesting signal for requesting acquisition of wordbook data to the WES server 30 (step T4).

Upon receipt of the wordbook data (32*f*) sent from the WES server 30 in response to the sending of the wordbook acquisition requesting signal to the WES server 30 (step T5), in accordance with the above-describe process in steps S7 and S8 of FIG. 9, the control unit 21 stores and registers, in the wordbook data storage area 22*e*, wordbook data (22*e*), which is obtained by adding the following registration information items to the received wordbook data (32*f*) for each word (step T6): [display/non-display] ("display: TRUE" in the default setting), [the number of times of displaying cards] ("0" in the default setting), [the number of times of tapping after notification] ("0" in the default setting), [the number of times for sending a notification] ("0" in the default setting), [notification history] ("blank" in the default setting), and [word-to-review] ("1" in the default setting).

In the case where the wordbook updating button Rn is pressed (touched) on the conditions that the wordbook data (22*e*) has already been registered in the wordbook data storage area 22*e* (step T1, Yes in step T2) and the process proceeds to the wordbook data displaying processing with a word card (English word) TCa or a word card (translation) TCb of a discretionarily chosen word being displayed (step T7) (No in step T8 then Yes in T3), the control unit 21 merges the latest wordbook data (32*f*) received from the WES server 30 into the already-registered wordbook data (22*e*) and registers the wordbook data (step T4 through step T6).

For example, for a word included in the latest wordbook data (32*f*) received from the WES server 30 and in the already-registered wordbook data (22*e*), of the registration information associated with the word, [date and time of search], [the number of times a search is performed], [view time], [search rate], are updated to the latest information and registered, while [display/non-display], [the number of times of displaying cards], [the number of times of tapping after notification], [the number of times sending a notification], [notification history], [word-to-review] remain the same.

<Wordbook Data Display Processing (Step T7)>

For example, as shown in FIG. 11A, if the area of a word card (English word) TCa displayed in the wordbook initial screen G1*a* is tapped, the control unit 21 causes the screen to display the word card (translation) TCb as shown in FIG. 11B, and if the area of the word card (translation) TCb is tapped, the control unit 21 causes the screen to display the original word card (English word) TCa as shown in FIG. 11A.

If the next button Ne of the word card (English word) TCa or the word card (translation) TCb is tapped, the control unit 21 causes the screen to display a next word card (English word) TCa or a word card (translation) TCb in the wordbook data (22*e*). If the back button Ba of the word card (English word) TCa or the word card (translation) TCb is tapped on the other hand, the control unit 21 causes the screen to display a previous word card (English word) TCa or a word card (translation) TCb in the wordbook data (22*e*).

The user can thereby, through good operation, learn words by flipping the word cards TCa and TCb, as if learning with a set of paper word cards.

As shown in FIG. 11A, if the search information button F added to the word card (English word) TCa is touched, the control unit 21 causes a screen to display information such as the number of times a search is performed by a user and a search rate corresponding to the user attributes, which are stored in the wordbook data storage area 22*e* in association with the word on the word card (English word) TCa ("sear" in this example).

Thus, for the word displayed as a word card, the user can easily confirm the number of times they have themselves searched the word with the dictionary in order to learn it, and the rate at which the peer users (in other words, rivals), in the same grade or who aim to enter the same school as the user, have searched the word with the dictionary in order to learn it, thereby allowing the user to make good use of the information for their learning process.

As shown in FIG. 11A, if a word list button L added to the word card (English word) TCa is touched, the control unit 21 displays the word list screen G2 showing a list of words included in the wordbook data (22*e*), as shown in FIG. 11C. In the display area of each word in the word list screen G2, a SHOW button Sh and a HIDE button Hi are provided in such a manner as to be switchable via a user operation, so that a user can switch between the display and non-display of each word in the wordbook data display (22*e*) at their discretion by switching the SHOW button Sh for the word the user has learned to the HIDE button Hi.

Herein, for the word displayed with the SHOW button Sh, the registration information of [display/non-display] of the wordbook data (22*e*) shown in FIG. 6 is set to "display: TRUE"; for the word displayed with the HIDE button Hi, the registration information is set to "non-display: FALSE".

On the screen displaying the wordbook data (22*e*), if there is an operation to close the screen (Yes in step T8), the control unit 21 finishes the above-described series of wordbook using processing.

Figure 12:
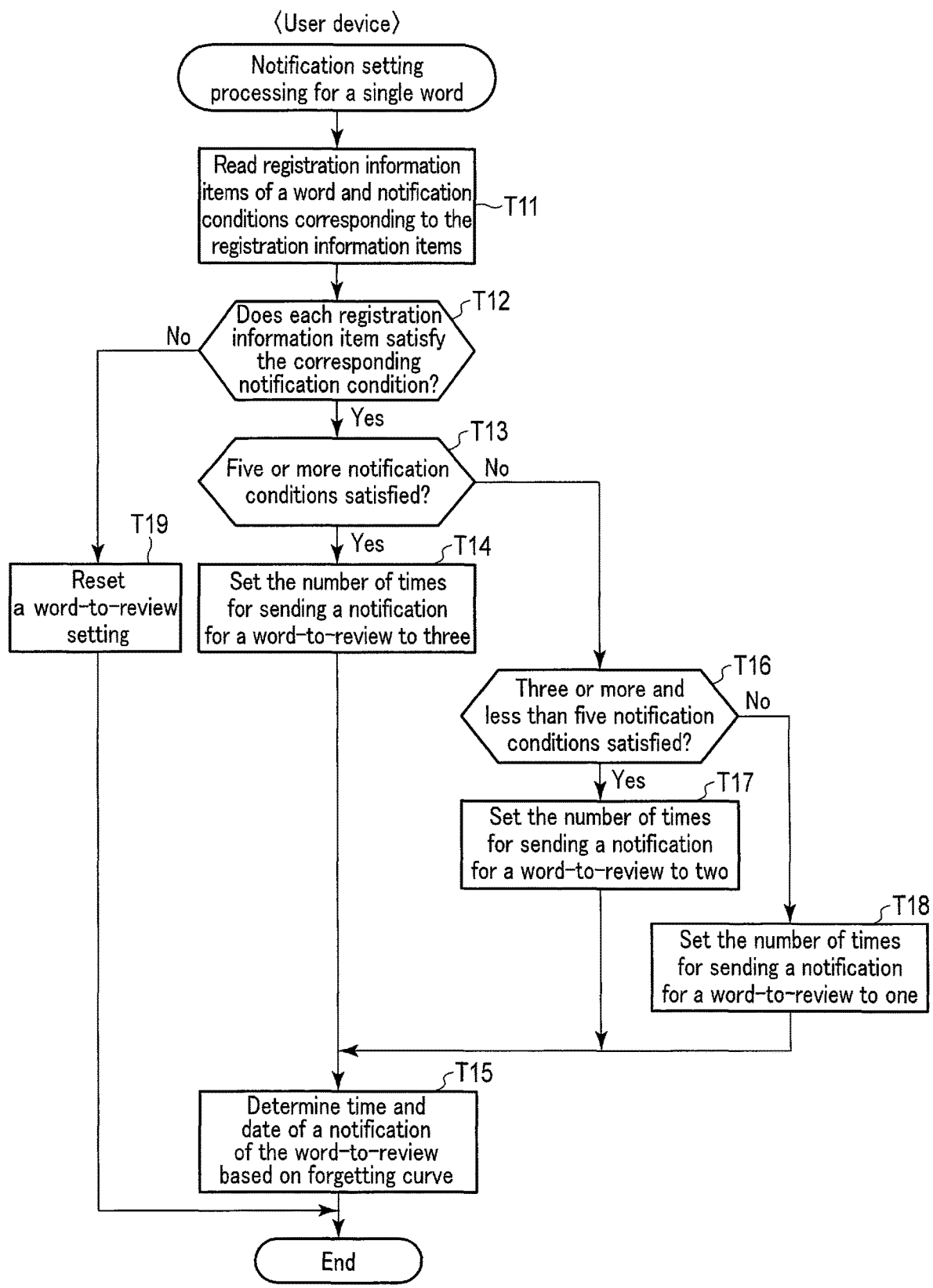
FIG. 12 is a flowchart showing notification setting processing for a word-to-review in accordance with a WES-using application 22b of the user device 20.

FIG. 12 is a flowchart showing notification setting processing for a word-to-review in accordance with a WES-using application 22*b* of the user device 20.

The notification setting processing for the words-to-review is processing in which each word-to-review included in the wordbook data (22*e*) and stored in the wordbook data storage area 22*e* is determined as to whether the user wants or needs to learn with a high priority based on multiple predetermined notification conditions, and the words-to-review that satisfy the notification conditions are targeted for notification and the number of times for sending a notification in accordance with the number of the satisfied notification conditions.

The notification setting processing for the words-to-review may be performed every time the wordbook data (22*e*) registered in the wordbook data storage area 22*e* is updated in accordance with the above-described wordbook use processing (see FIG. 10), for example.

If the notification setting processing is activated in the user device 20, the control unit 21 reads predetermined registration information items (herein, [display/non-display], [the number of displaying cards], [the number of times of tapping after notification], [date and time of search], [the number of times a search is performed], [view time], [search rate organized by user's school of choice]) from the registration information associated with a word-to-review, for each word-to-review included in the wordbook data (22e) registered in the wordbook data storage area 22e. Furthermore, the control unit 21 reads the notification conditions corresponding to predetermined registration information items (herein, [display/non-display], [the number of times of displaying cards], [the number of times of tapping after notification], [date and time of search], [the number of times a search is performed], [view time], [search rate organized by user's school of choice]) from the word-to-review notification conditions stored in the word-to-review notification condition data storage area 22d (step T11).

In the word-for-review notification condition data storage area 22d, the following information items are set as the words-to-review notification conditions, as described above: [display/non-display] which is information indicating "display"; [date and time of search] which is information indicating "date and time" (e.g., date and time a year ago) serving as a threshold for determining whether or not the search postdates a predetermined date and time; [the number of times for displaying cards], [the number of times of tapping after notification], and [the number of times a search performed] which comprise information indicating "the number of times" serving as a threshold for determining whether or not a search has been performed more than the predetermined number of times within a predetermined period of time (e.g., within a year); [view time] is information indicating "time (s)" serving as a threshold for determining whether viewing that occurs within a predetermined period of time continues for longer than a predetermined length of time; and [search rate organized by user's school of choice] which is information indicating "rate (%)" serving as a threshold for determining whether the search was performed at a search rate higher than a predetermined rate within a predetermined period of time. The parameters of "date and time", "the number of times", "time (s)", "rate (%)" are weighting values that correspond to the degree to which the user either has learned (has not learned) or needs to learn a word.

The control unit 21 determines whether or not each of the registration information items associated with the word-to-reviews read from the wordbook data (22e) in step T11 ([date and time], [number of times for displaying cards], [the number of times of tapping after notification], [date and time of search], [the number of times a search is performed], [view time], [search rate organized by user's school of choice]) satisfies each of the words-to-review notification conditions read from the word-to-review notification condition data storage area 22d (step T12).

Herein, if it is determined that five or more notification conditions are satisfied by some of the registration information items for a word-to-review that are read from the wordbook data (22e), including the information [display/non-display] being set to "display" (Yes in step T13), the control unit 21 sets the number of times for sending a notification to three times for the word-to-review (step T14).

The control unit 21 sets dates and times to three times for displaying the word-to-review as a push notification in correspondence with the three times of notification already set, in accordance with optimal timing for review based on the characteristics of human forgetfulness as described above with reference to FIG. 8 (herein, first time R1 which is set at two days after the original review, second time R2 which is set at one week after the original review, and third time R3 which is set at one month after the original review) (step T15).

For example, the date and time of the original learning of the word-to-review targeted for notification is a date and time of a dictionary search included in [search date and time], and the date and time after two days of the original search is set as first time R1, the date and time after one week is set as second time R2, the date and time after one month is set as third time R3 are set as push notification dates and times, and stored as information of notification history] (step T15).

If it is determined that three or four notification conditions, including the information [display/non-display] being set to "display", are satisfied by the plurality of registration information items read from the wordbook data (22e) (Yes in step T16), the control unit 21 sets the number of times for sending a notification to two times for the targeted word-to-review (step T17).

The control unit 21 sets dates and times to two times for displaying the word-to-review as a push notification in correspondence with the two times of notification already set, in accordance with optimal timing for review based on the characteristics of human forgetfulness as described above with reference to FIG. 8 (first time R1 and second time R2), and stored as information of [notification history] (step T15).

If it is determined that one or more, and less than three, notification conditions are satisfied, including that the information [display/non-display] is set to "display", by the plurality of registration information items of the words-to-review read from the wordbook data (22e) (No in step T16), the control unit 21 sets the number of times for sending a notification to one time for the word-to-review (step T18).

The control unit 21 sets a date and time to one time for displaying the word-to-review as a push notification in correspondence with the one time of notification already set, in accordance with optimal timing for review based on the characteristics of human forgetfulness (first time R1), and stored as information of [notification history] (step T15).

In the case that none of the plurality of registration information items read by the wordbook data (22e) satisfies the notification conditions (No in step T12), the control unit 21 sets information [words-to-review] associated with the corresponding words-to-review in the wordbook data (22e) to a word-to-not review "0", and the word-to-review is released from the push notification target (step T19).

Thereafter, following the processing step T11 to step T19, it is determined whether or not a word-to-review included in the wordbook data (22e) stored in the wordbook data storage area 22e is targeted for a push notification. For the word-to-review targeted for notification, the number of times for sending a notification in accordance with the number of satisfied notification conditions, and the time and date of a push notification are set. After the processing is performed for all words-to-review, the control unit 21 finishes the above-described series of the notification setting processing for words-to-review.

It is thereby possible to effectively set a word-to-review that a user either wants to or needs to learn with a high priority among the words included in the wordbook data (22e) as a target for a push notification to be sent to the user, and to set the number of times for sending a push notification with a frequency according to the number of satisfied notification conditions, which indicate the degree to which the user either wants or needs to remember a word with a high priority.

The dates and times for user review of a word-to-review (dates and times for sending a push notification) can be set in accordance with the optimal timing for review, which is determined from the timing of previous learning and predicted to be optimal for efficient and effective user learning of the word-to-review.

The number of notification conditions and the number of times for sending notifications set in accordance with the number of satisfied notification conditions are not limited to those in the above-described example with reference to FIG. 12; a greater number may be set for the number of times for sending a notification if more notification conditions are satisfied.

Figure 13:
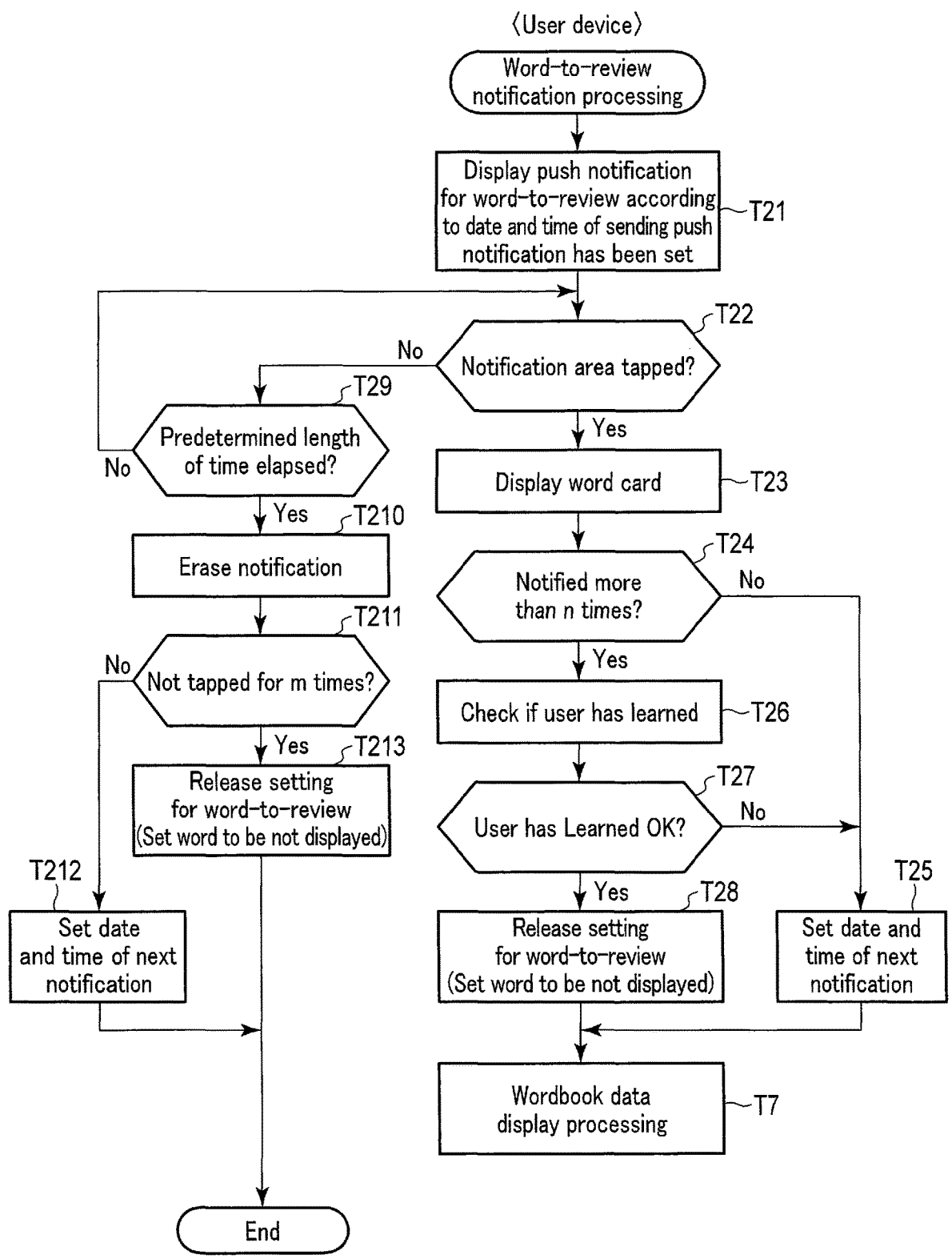
FIG. 13 is a flowchart showing word-to-review notification processing in accordance with a WES-using application 22b of the user device 20.

FIG. 13 is a flowchart showing word-to-review notification processing in accordance with a WES-using application 22b of the user device 20.

Figure 14:
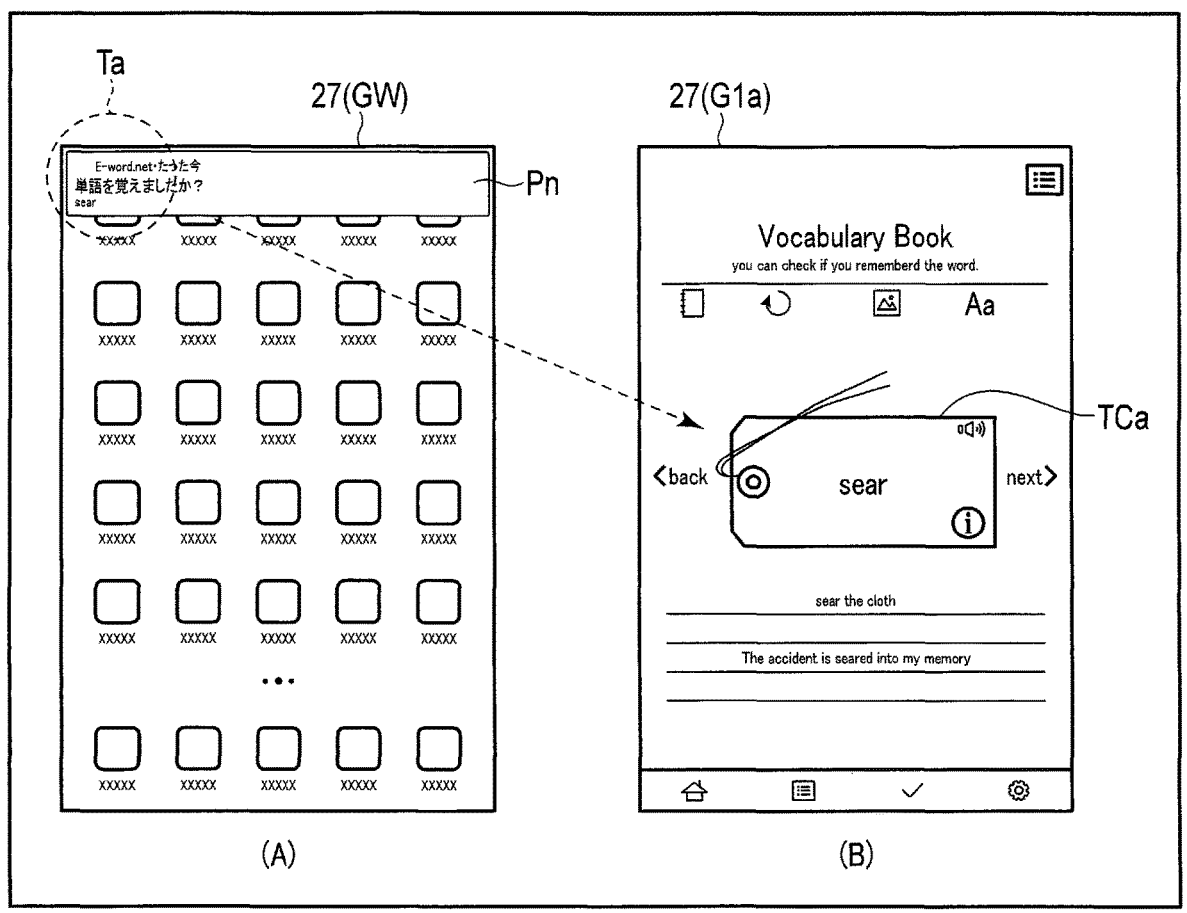
FIG. 14 is a diagram showing a display operation (part 1) after the sending of a push notification Pn and tapping thereof Ta in accordance with the word-to-review notification processing of the user device 20.

FIG. 14 is a diagram showing a display operation (part 1) after sending a push notification Pn and tapping thereof Ta in accordance with the word-to-review notification processing of the user device 20.

Figure 15:
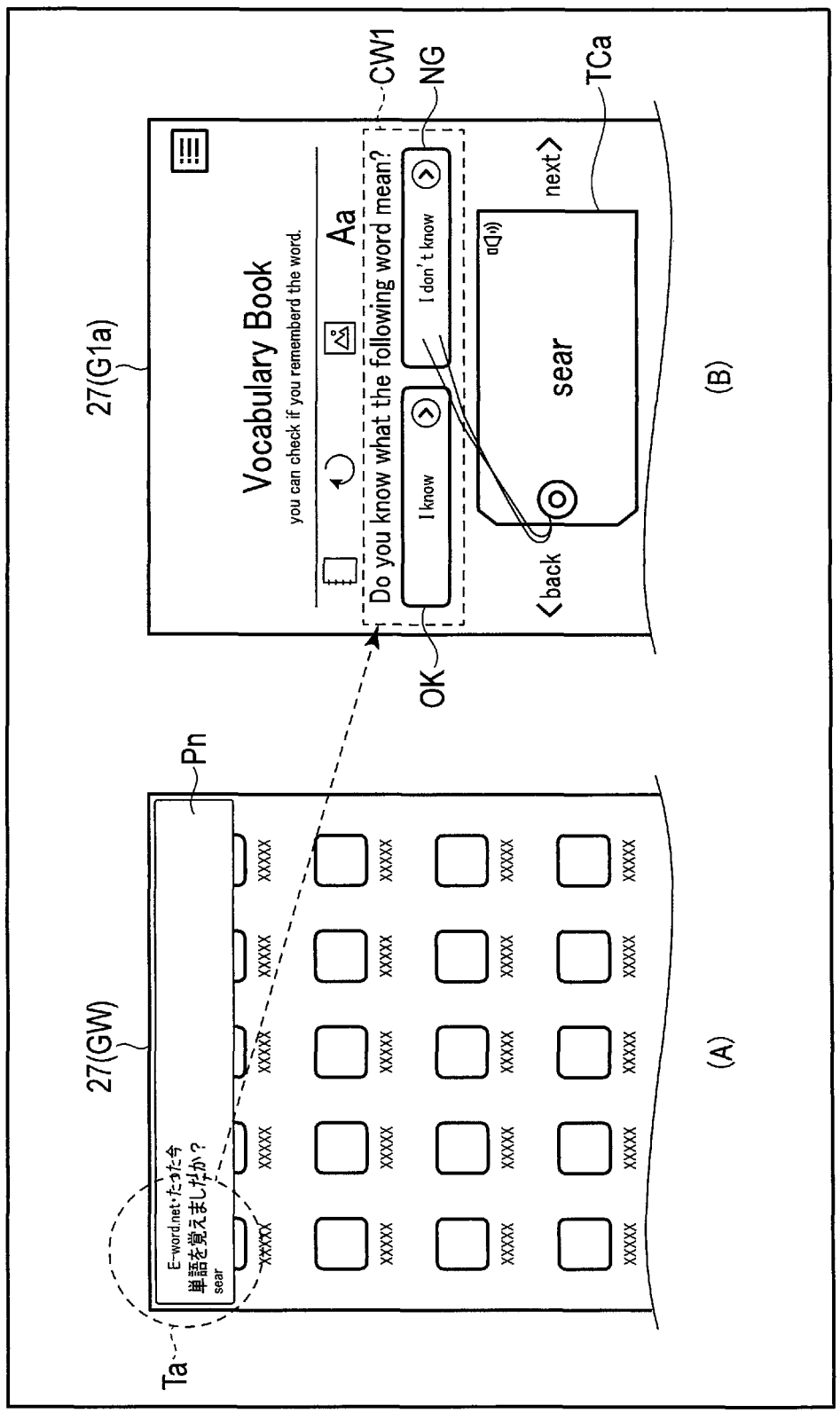
FIG. 15 is a diagram showing a display operation (part 2) after the sending of a push notification Pn and the tapping thereof Ta in accordance with the word-to-review notification processing of the user device 20.

FIG. 15 is a diagram showing a display operation (part 2) after sending a push notification Pn and tapping thereof Ta in accordance with the word-to-review notification processing of the user device 20.

FIG. 16 is a diagram showing a display operation (part 3) after sending a push notification Pn and tapping thereof Ta in accordance with the word-to-review notification processing of the user device 20.

In the user device 20, the control unit 21 causes, for example, the stand-by screen GW displayed on the touch-panel display unit 27 to display a push notification Pn of a word-to-review ("sear" in this example) as shown in the timing (A) in FIG. 14 or the timing (A) shown in FIG. 15, or the timing (A) in FIG. 16 in accordance with the date and time of sending a push notification already set in the [notification history] associated with a word-to-review "1" (a word-to-review targeted for notification) among the words included in the wordbook data (22e) (see FIG. 6) stored in the wordbook data storage area 22e (step T21). The control unit 21 increments and updates the [number of times of notification] associated with a word-to-review of the wordbook data (22e) for which the push notification Pn was sent.

After the user performs a touch operation (tapping) Ta on the area of the push notification Pn for the word-to-review displayed on the touch-panel display unit 27 (Yes in step T22), the control unit 21 causes the touch-panel display unit 27 to display the wordbook initial screen G1a on which the word card (English word) TCa of the tapped word-to-review displayed as a push notification Pn ("sear" in this example), as shown in the timing (B) of FIG. 14 (step T23). The control unit 21 increments and updates the [number of times of tapping after notification] in the wordbook data (22e) associated with the tapped word-to-review displayed as a push notification Pn.

The control unit 21 determines whether or not the [number of times of tapping after notification] corresponding to the word-to-review displayed as a push notification Pn reaches the predetermined number of times for sending a notification (n) (step T24).

The number of times for sending a notification, n may be set to three (n=3) with which a user would retain the word-to-review at 80% or higher by repetitive reviewing of the word-to-review, based on the characteristics of human forgetfulness.

Herein, if the [number of times for sending a notification] corresponding to the word-to-review displayed as a push notification Pn does not reach the predetermined number of times for sending a notification (n) (No in step T24), the control unit 21 sets the date and time of a next push notification, which is stored as the information of [notification history], as a date and time for displaying the same word-to-review as a push notification (step T25).

The control unit 21 proceeds to the wordbook data display processing in the wordbook using process which was described with reference to FIG. 10, and performs wordbook data display processing for displaying a word card (English word) TCa, a word card (translation) TCb, or a word list screen G2 in accordance with a user's operation, as shown in FIG. 11 for example (step T7).

In step 124, on the other hand, if the [number of times for sending a notification] corresponding to the word-to-review displayed as a push notification Pn reaches the predetermined number of times for sending a notification (n) (Yes in step 124), the control unit 21 causes the wordbook initial screen G1a on which the word cad (English word) TCa of a word-to-review is displayed to display the acquisition confirmation window CW1 in which a [I know] button OK and a [I don't know] button NG for checking whether the user retains the word-to-review ("sear" in this example) as shown in the timing (B) of FIG. 15 (step T26).

Instead of displaying the acquisition confirmation window CW1, the user may be instructed to input a translation of a word-to-review displayed as the word card (English word) TCa and a window (not shown) may be displayed for a vocabulary quiz for checking whether the user learns the word-to-review, and the control unit 21 may then determine the veracity or falseness of the translation that is input to the vocabulary quiz window based on the wordbook data (22e) or the dictionary database (32b) of the WES server 30 to check for acquisition of the word-to-review.

Instead of displaying the acquisition confirmation window CW1, for example, the user may be instructed, as shown in the timing (B) of FIG. 16, to select one from three answer buttons A1, A2, and A3 for a translation of a word-to-review displayed as the word card (English word) TCa, and a window CW2 with three choices may be displayed for a vocabulary quiz for checking whether the user learns the word-to-review, and the control unit 21 may then determine the veracity or falseness of the translation corresponding to the answer button An, selected in the three-choice window CW2 based on the wordbook data (22e) or the dictionary database (32b) of the WES server 30 to check acquisition of the word-to-review.

In this example, the acquisition confirmation process for words-to-review (step T26) is performed in a case where the number of times for sending a push notification Pn for a word-to-review reaches the predetermined number of times for sending a notification (n times); however, the process may be performed every time a user taps a push notification Pn, regardless of the number of times for sending a push notification Pn.

It is determined that the user has remembered the word-to-review (acquisition OK) (Yes in step T27) in the following cases: (i) the user touches the [I know] button OK in the case where the acquisition confirmation window CW1 is displayed at the timing (B) shown in FIG. 15 via the acquisition confirmation process for the word-to-review by the control unit 21 (step T26); (ii) the translation input by the user is determined to be true in the case where the vocabulary quiz window (not shown) is displayed via the acquisition confirmation process; or (iii) the translation of the answer button An selected by the user is determined to be true in the case where the three-option window CW2 is displayed as shown in timing (B) of FIG. 16 via the acquisition confirmation process. Thereafter, the control unit 21 sets the information of [words-to-review] associated with a corresponding word of the wordbook data (22e) to a word-to-not review "0" and stops sending a push notification Pn for the same word thereafter. The information of [display/non-display] associated with a corresponding word in the wordbook data (22e) is set to "non-display: FALSE" and stops displaying the word card TCa or TCb of the word in the wordbook data displaying process (step T7) (step T28).

Thereafter, the control unit 21 proceeds to the wordbook data displaying processing in the wordbook using the processing described above with reference to FIG. 10 (step T7).

On the other hand, it is determined that the user has not yet remembered the word-to-review (acquisition NG) (No in step T27) in the following cases: (I) the user touches the [I don't know] button NG in the case where the acquisition confirmation window CW1 is displayed at the timing (B) shown in FIG. 15 via the acquisition confirmation process for the word-to-review by the control unit 21 (step T26); (ii) the translation input by the user is determined to be false in the case where the vocabulary quiz window (not shown) is displayed via the acquisition confirmation process; or (iii) the translation of the answer button An selected by the user is determined to be false in the case where the three-option window CW2 is displayed as shown in timing (B) of FIG. 16 via the acquisition confirmation process. Thereafter, the control unit 21 sets the date and time of a next push notification, which is stored as the information of [notification history], as a date and time for displaying the same word-to-review as a push notification (step T25).

Thereafter, the control unit 21 proceeds to the wordbook data displaying processing in the wordbook using the processing described above with reference to FIG. 10 (step T7).

As shown in the timing (A) of FIG. 14, or the timing (A) of FIG. 15, or the timing (A) of FIG. 16, after displaying a push notification Pn for a word-to-review on the touch-panel display unit 27 (step T21), if a predetermined length of time (for example, three minutes) has elapsed (Yes in step T29) without a user's inputting of a touch operation (tapping) Ta in the area for the push notification Pn (No in step T22), the control unit 21 erases the push notification Pn (step T210).

Furthermore, it is determined by the number of times a user does not tap a push notification Pn, which can be obtained by deducting the [number of times of tapping after notification] from the [number of times for sending a notification] associated with a corresponding word in the wordbook data (22e), whether or not the predetermined number of times m (e.g., m=5) (step T211) is reached.

If the number of times a user does not tap the push notification Pn does not reach the predetermined number of times m (No in step T211), the control unit 21 sets the date and time of a next push notification, which is stored as the information of [notification history], as a date and time for displaying the same word-to-review as a push notification, or sets the date and time for after a predetermined period of time, and stores the date and time as information of the [notification history] for a corresponding word (step T212).

If the number of times a user does not tap a push notification Pn reaches the predetermined number of times m (Yes in step T211), the control unit 21 determines that the push notification Pn of the word-to-review is unnecessary for a user, sets the information of [word-to-review] associated with a corresponding word in the wordbook data (22e) to the word-to-not review "0", and stops sending a push notification Pn for the same word thereafter. The information of [display/non-display] associated with a corresponding word in the wordbook data (22e) is set to "non-display: FALSE" and the word card TCa or TCb of the word in the wordbook data displaying process (step T7) (step T213) ceases to be displayed.

Thus, with the word-to-review notification processing described with reference to FIGS. 13 to 16, a push notification Pn for a word-to-review that a user either wants or needs to learn with a high priority among the words included in the wordbook data (22e) is repeatedly sent in accordance with optimal timing for review at which the user's effective and efficient learn the word can be predicted. In addition, in a case where the user taps a push notification Pn, acquisition confirmation processing is performed to check whether or not the user remembers the targeted word-to-review, thereby making the user learn a word-to-review that the user either wants or needs to learn with high priority in an effective and efficient manner, without making the learning process seem forced to the user.

The wordbook using processing described with reference to FIG. 10, the word-to-review notification setting processing described with reference to FIG. 12, and the word-to-review notification processing described with reference to FIG. 13, may be performed by the WES server 30 in response to input and output processing in the user device 20 or the electronic dictionary 10.

Summary of Embodiment

According to a learning support system 1 of the embodiment, user wordbook data (22e) is generated based on search history data (32d) relating to user search for a word in a dictionary, associating a word (word-to-review) included in the search history data (32d) with a plurality of register information items, such as [date and time of search], [number of times a search is performed], [view time], [search rate], [display/non-display], [number of times of displaying cards], [number of times of tapping after notification]. Furthermore, among the words-to-review included in the wordbook data (22e), words-to-review that satisfy predetermined notification conditions respectively corresponding to a plurality of registration information items are set as targets for notification, and the number of times for sending a notification is set in accordance with the number of notification conditions satisfied by the words-to-review. Thereafter, the word-to-review set as a target for notification in the wordbook data (22e) is displayed on the touch-panel display unit 27 as a push notification Pn for the set number of notification times at a timing in accordance with the characteristics of human forgetfulness.

With the system, it is possible not only to efficiently set the number of times for a word-to-review, that the user either wants or needs to learn, with high priority among the words included in the wordbook data (22e) as targets for notification at the number of times for sending a notification, which is set in accordance with the number of notification conditions satisfied by the word, but also possible to send the word-to-review targeted for notification to a user as a push notification Pn in accordance with the date and time of review with which effective and efficient user learning of the word can be predicted. It is thus possible for the user to effectively and efficiently review the words they desire to learn.

According to the learning support system 1 of the embodiment, in a case where a push notification Pn of a word-to-review is tapped to open in response to a tap operation Ta, a display for checking whether or not a user has learned the word-to-review on the display unit 27 is realized by the acquisition confirmation window CW1, by a window (not shown) of a word quiz that instructs a user to input a translation of a word-to-review, or by a three-choice window CW2 of a word quiz that instructs a user to select one from three answer buttons A1, A2, and A3 for a correct translation of a word-to-review. Furthermore, if it is confirmed that the user has learned a word-to-review, the setting with which a push notification Pn of a word-to-review is displayed on the display unit 27 is released; if it is confirmed that the user has not yet learned a word-to-review, a date and time for a next push notification for displaying a push notification Pn of the word-to-review on the display unit 27 is set.

It is thereby possible to stop sending a push notification Pn for a word-to-review immediately in a case where a user learns the word-to-review, and if a user cannot memorize a word-to-review, the word can be displayed as a push notification Pn repeatedly at effective timing.

According to the learning support system 1 of the embodiment, if the number of times a push notification Pn is not tapped for opening by a tap operation Ta after being displayed on the display unit 27 is equal to or greater than m, the setting for displaying a push notification Pn of a word-to-learn on the display unit 27 is released.

It is therefore possible to make a user prioritize the learning of a word-to-review that the user either wants or needs to learn in an effective and efficient manner, without making the learning process seem forced to the user.

The procedures of each processing by the learning support system 1 described in each of the foregoing embodiments, namely the procedures of the wordbook generation processing in the WES server 30 shown in the flowchart of FIG. 9, the wordbook using processing in the user device 20 shown in the flowchart of FIG. 10, the word-to-review notification setting processing in the user device 20 shown in the flowchart of FIG. 12, and the word-to-review notifications processing in the user device 20 shown in the flowchart of FIG. 13 can be stored as computer-executable programs in a medium of an external storage device, such as a memory card (ROM card, RAM card), magnetic disk (Floppy™ disk, hard disk), an optical disk (CD-ROM, DVD, etc.), a semiconductor memory, and can be distributed. Furthermore, a control unit (CPU) of an information processing apparatus (electronic device) reads the program stored in the medium of the external storage apparatus, and the operations can be executed and controlled based on those read programs, thereby realizing the various functions described in the embodiments, and executing processing similar to the above-described procedures.

The data of the programs for realizing each of the above-described procedures can be transmitted on a communication network (N) in the form of program codes, and data of the programs is obtained from a computer apparatus (program server) connected to this communication network (N) and imported to an information processing apparatus (electronic device), and stored in a storage apparatus, thereby realizing the foregoing various functions.

The present invention is not limited to the above-described embodiment and various modifications can be made without departing from the scope of the present invention in practical stages. The foregoing embodiments may be appropriately combined and practiced. In addition, the above-described embodiments include inventions of various stages, and a variety of inventions can be derived by properly combining structural elements of either one embodiment or different embodiments. For example, if the object of the invention is achieved and the advantages of the invention are attained even after some of the structural elements disclosed in connection with the embodiments are deleted, the structure made up of the resultant structural elements can be extracted as an invention.

What is claimed is:

1. An information processing apparatus comprising at least one processor that executes a program stored in a storage unit, the at least one processor being configured to:
   acquire a plurality of registration information items relating to a word searched by a user;
   determine whether or not each of the registration items relating to the word satisfies a condition that is set in association with each of he registration information items, and derive the number of registration information items that satisfy the condition; and
   set a frequency of outputting a quiz relating to the word in a case where the quiz is repeatedly output to a value corresponding to the derived number.

2. The information processing apparatus according to claim 1, wherein
   the at least one processor is configured to set output timing in a case where the quiz is repeatedly output based on a date and time at which the word is searched by the user and characteristics of human forgetfulness.

3. The information processing apparatus according to claim 1, wherein
   the information processing apparatus comprises a display unit, and
   the at least one processor is configured to output a quiz relating to the word by indicating a push notification on the display unit.

4. The information processing apparatus according to claim 3, wherein
   the at least one processor is configured to cause the display unit to display a confirmation screen for checking whether the user has learned the word provided as a quiz if the quiz of the word sent as a push notification is opened in response to a user's operation.

5. The information processing apparatus according to claim 3, wherein
   the at least one processor is configured to cause the display unit to display a selection screen on which a user is instructed to select an answer from multiple answer candidates, or an input screen on which a user is instructed to write an answer if a quiz relating to the word sent as a push notification is opened in response co a user's operation.

6. The information processing apparatus according to claim 5, wherein
   the at least one processor is configured to set whether or not a quiz can be output the next time according to the veracity or falseness of the answer.

7. The information processing apparatus according to claim 3, wherein
   an output of the quiz at the output frequency is stopped if the number of times the user does not open the quiz relating to the word sent as a push notification to the display unit within a predetermined length of time exceeds a predetermined number of times.

8. The information processing apparatus according to claim 1, wherein
   the at least one processor is configured to:
   obtain the number of times for performing a search of the word within a predetermined length of time as one of the registration information items; and
   determine that a condition relating to the number of times a search for the word is performed within the predetermined length of time is satisfied if the number is larger than a predetermined number.

9. The information processing apparatus according to claim 1, wherein
the at least one processor is configured to:
obtain a view time of the word within a predetermined length of time as one of the registration information items; and
determine that a condition relating to the view time of she word within the predetermined length of time is satisfied if the view time is longer than a predetermined number.

10. The information processing apparatus according to claim 1, wherein
the at least one processor is configured to:
obtain a latest date and time of search for the word as one of the registration information items; and
determine that a condition relating to the latest date and time of search for the word is satisfied if the latest date and time of search for the word follows a predetermined date and time.

11. The information processing apparatus according to claim 1, wherein
the at least one processor is configured to:
obtain attribute information of a user who searched the word as one of the plurality of registration information items; and
determine that a condition relating to the attribute information of the user who searched for the word is satisfied if the attribute information of the user who searched for the word is predetermined registration information.

12. The information processing apparatus according to claim 1, comprising:
a communication unit for communicating with an electronic dictionary, wherein
a search for the word by the user is performed with the electronic dictionary, and
the at least one processor obtains a plurality of registration information items relating to the word through a communication with the electronic dictionary.

13. The information processing apparatus according to claim 1, wherein
the at least one processor is configured to set a quiz output frequency in such a manner that an interval for outputting she quiz becomes longer each time the quiz is output.

14. The information processing apparatus according to claim 1, wherein
the at least one processor is configured to:
set the number of times for outputting a quiz at the output frequency to the number of times in accordance with the derived number.

15. An information processing method executed by a computer, the method comprising:
acquiring a plurality of registration information items relating to a word searched by a user;
determining whether or not each of the registration items relating to the word satisfies a condition set in association with each of the registration information items, and deriving the number of registration information items that satisfy the condition; and
setting a frequency for outputting a quiz relating to the word in a case where the quiz is repeatedly output to a value corresponding to the derived number.

16. The information processing method according to claim 15, wherein
output timing in a case where the quiz is repeatedly output is set based on a date and time at which the word is searched by the user and the characteristics of human forgetfulness.

17. The information processing method according to claim 15, wherein
a frequency for outputting the quiz is set in such a manner that an interval of outputting the quiz becoming longer each time the quiz is output.

18. A non-transitory computer-readable storage medium storing a program executable by at least one processor of an information processing apparatus, the at least one processor configured to, in compliance with the program:
acquire a plurality of registration information items relating to a word searched by a user;
determine whether or not each of the registration items relating to the word satisfies a condition set in association with each of the registration information items, and derive the number of registration information items that satisfy the condition; and
set a frequency for outputting a quiz relating to the word in a case where the quiz is repeatedly output to a value corresponding to the derived number.

19. The storage medium according to claim 18, wherein the at least one processor configured to, in compliance with the program:
set output timing in a case where the quiz is repeatedly output based on a date and time at which the word is searched by the user and the characteristics of human forgetfulness.

20. The recording medium according to claim 18,
the at least one processor configured to, in compliance with the program:
set a frequency for outputting the quiz in such a manner that an interval of outputting the quiz becomes longer each time the quiz is output.

* * * * *

UNITED STATES PATENT AND TRADEMARK OFFICE
CERTIFICATE OF CORRECTION

PATENT NO. : 12,182,189 B2
APPLICATION NO. : 17/894496
DATED : December 31, 2024
INVENTOR(S) : Asami Aso It is certified that error appears in the above-identified patent and that said Letters Patent is hereby corrected as shown below:

In the Claims

Column 20, Claim 1, Line 13, delete "he" and insert --the--;

Column 20, Claim 5, Line 47, delete "co" and insert --to--;

Column 21, Claim 9, Line 10, delete "she" and insert --the--;

Column 21, Claim 10, Line 34, delete "1," and insert --1--;

Column 21, Claim 13, Line 46, delete "she" and insert --the--.

Signed and Sealed this
Twenty-fifth Day of March, 2025

Coke Morgan Stewart
*Acting Director of the United States Patent and Trademark Office*